Nov. 29, 1927.  
C. C. HANKS  
1,651,202  
VEGETABLE AND FRUIT SLICER  
Filed Jan. 9, 1926   2 Sheets-Sheet 1
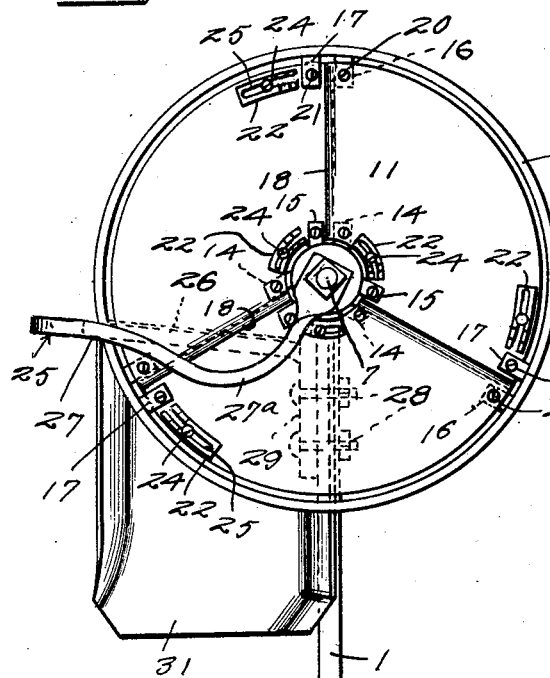
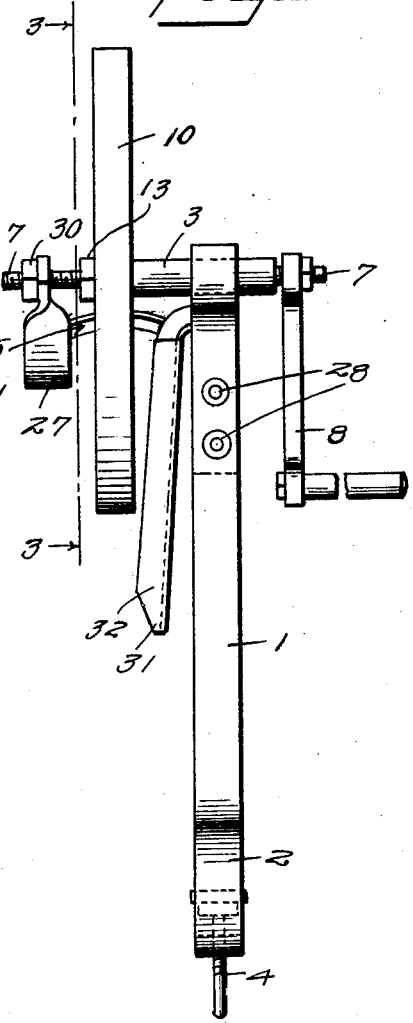
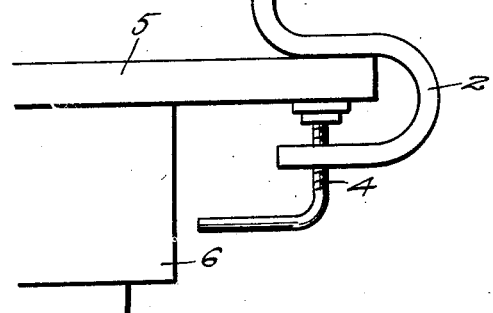
Inventor  
C. C. Hanks,

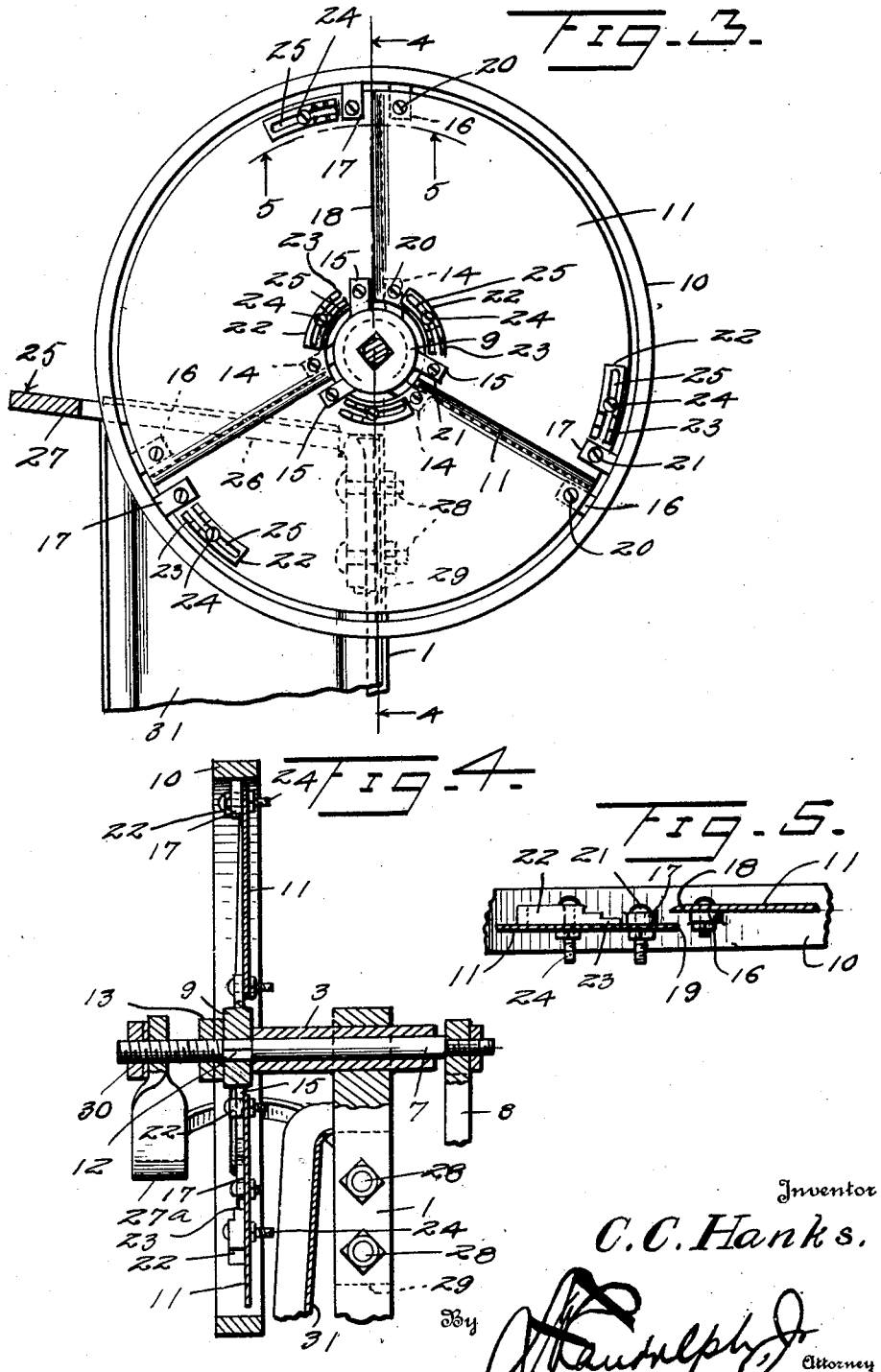

Patented Nov. 29, 1927.

1,651,202

UNITED STATES PATENT OFFICE.

CLIFFORD C. HANKS, OF PEARL, ILLINOIS.

VEGETABLE AND FRUIT SLICER.

Application filed January 9, 1926. Serial No. 80,223.

This invention relates to vegetable cutters, and has for one of its objects the provision of a device of this character which shall include a rotatable member, and cutting blades carried by the rotatable member for adjustment relatively in the direction of the axis of rotation so as to permit vegetables to be cut up into slices of different thickness.

A further object of the invention is the provision of a vegetable cutter of the character stated wherein the blades shall be of sector formation and secured to the rotatable member with the forward or cutting edge of one blade arranged in axially spaced relation to the rearward portion of the next forward blade, the rearward portions of the blades being adjustable with respect to the cutting edges so as to adapt the device for cutting articles into slices of different thickness.

A further object of the invention is the provision of novel and simple means through the medium of which the stated adjustment of the cutting blades may be easily and quickly effected.

A further object of the invention is the provision of a vegetable cutter which shall include a novel and simple support for the vegetables being sliced.

A still further object of the invention is the provision of a vegetable cutter which shall be simple, durable and highly efficient, and which may be manufactured and sold at a comparatively low cost.

With the above and other objects in view, the invention consists of the construction, combination and arrangement of parts hereinafter fully described and claimed, and illustrated in the accompanying drawings, wherein:

Figure 1 is a view in front elevation of a vegetable slicer constructed in accordance with my invention, Figure 2 is a view in side elevation of the vegetable slicer, Figure 3 is a sectional view taken on the vertical plane indicated by the line 3—3 of Figure 2, Figure 4 is a sectional view taken on the vertical plane indicated by the line 4—4 of Figure 3, and Figure 5 is a detail sectional view taken on the plane indicated by the line 5—5 of Figure 3.

Corresponding and like parts are referred to in the following description, and designated in the several views of the accompanying drawings, by similar reference characters.

The vegetable slicer comprises a standard 1 provided at its lower end with a loop 2 and at its upper end with a bearing 3. The loop 2 carries a clamping screw 4, and these parts provide means by which the vegetable slicer can be secured to the top 5 of a table 6 in the manner shown in Figure 1. A shaft 7 is rotatably mounted in the bearing 3, and a hand crank 8 is secured to one end thereof. A cutter embodying a hub 9, a rim 10 and blades 11 connected to the hub and rim, is secured to the shaft 7 which is provided with a polygonal portion 12 on which the hub 9 is positioned. The cutter is retained on the shaft 7 by nuts 13 or other suitable elements.

The hub 9 is provided with outwardly directed lugs 14 and 15, and the rim 10 with inwardly directed lugs 16 and 17. The blades 11 which are of sector formation and provided with radial cutting edges 18, are secured adjacent their cutting edges 18 to certain sides of the series of lugs 14 and 16 by bolts 20. The blades 11 are secured adjacent their other edges 19 to the opposite sides of the series of lugs 15 and 17 by bolts 21. Due to the manner in which the blades 11 are secured to the lugs 14—17, the cutting edge 18 of one blade is spaced axially from the next forward blade. The rearward portions 19 of the blades 11 may be adjusted axially with respect to the cutting edges 18, and when said portions are in contact with the lugs 15 and 17 the machine is adjusted for cutting slices of the minimum thickness. When it is desired to cut slices of greater thickness, the rearward portions 19 of the blades 11 are moved axially away from the cutting edges 18, and this may be readily done since the blades are flexible after loosening the bolts 21. Blocks 22 are secured to the front sides of the blades 11 adjacent the lugs 15 and 17, and are provided with spacing elements 23 of different thickness. The blocks 22 are secured to the blades 11 by bolts 24, and are provided with elongated slots 25 through which the bolts pass. The blocks 22 may be adjusted in the direction of and away from the lugs 15 and 17, after first loosening the bolts 24, and they may be secured in adjusted position by tightening the bolts. By loosening the bolts 21, bending the rearward portions of the blades 11 axially away from the cutting edges 18, adjusting the blocks 22 so as to position the narrower or wider spacing elements 23 thereof between the blades and lugs 15 and 17, and thereafter tightening the bolts 21 and 24, the device will be adjusted for cutting articles into slices of greater thickness.

A bracket 25 and embodying an arm 26 located at the rear side of the cutter and an arm 27 located at the front side thereof, is secured by bolts 28 to the standard 1. The arm 26 is provided with an angular extension 29 at its inner end, and it is with this extension that the bolts 28 engage. The outer ends of the arms 26 and 27 are connected, and the inner end of the arm 27 is provided with an opening for the reception of the front end of the shaft 7, and this end of this arm is secured to the shaft by a nut 30. That portion of the arm 27 located directly in front of the blades 11 is of arcuate formation or downwardly curved as shown at 27 to provide a rest for the articles being sliced. A plate 31 is secured to and depends from the arm 26. The plate 31 is provided with side flanges 32, and is adapted to direct the slices into a bowl or other receptacle placed on the support to which the device is secured.

From the foregoing description, taken in connection with the accompanying drawings, it will be apparent that by rotating the cutter through the medium of the hand crank 8 and holding an article on the support 27 and in contact with the blades 11, the article will be cut up in slices. The slices will drop onto the plate 31 and be directed by it into the bowl provided for the reception of the same. It will be further understood that by adjusting the rearward portions 19 of the blades 11 axially with respect to the cutting edges 18 of the blades, articles may be cut into slices of different thickness, that this adjustment of the blades may be readily and quickly effected, and that the blades are firmly fixed in adjusted position. The device may be used for slicing potatoes, apples, turnips, tomatoes, beets, cabbage, pumpkins and the like.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A vegetable slicer comprising a standard, a shaft journaled in the standard, an operating member connected to the shaft, a cutter connected to the shaft, a bracket having arms secured to the standard and shaft and having one arm thereof bent to constitute an article rest and a plate secured to and depending from the other arm of the bracket.

2. A vegetable slicer including a shaft, a hub fixed to the shaft, a rim surrounding the hub, a series of lugs carried by the hub and rim, a second series of lugs carried by the hub and rim, blades positioned between the hub and rim, and having their forward edges positioned at one side of said first series of lugs and having their rearward edges positioned at the opposite side of said second series of lugs, means securing the forward edges of the blades to said first series of lugs, and means securing the rearward edges of the blades to said second series of lugs for adjustment axially with respect to the forward edges of the blades.

3. A vegetable slicer including a shaft, a hub fixed to the shaft, a rim surrounding the hub, a series of lugs carried by the hub and rim, a second series of lugs carried by the hub and rim, blades positioned between the hub and rim and having their forward edges positioned at one side of said first series of lugs and having their rearward edges positioned at the opposite side of said second series of lugs, means securing the forward edges of the blades to said first series of lugs, means securing the rearward edges of the blades to said second series of lugs for adjustment axially with respect to the forward edges of the blades, and blocks having spacing elements of different thickness adapted to be positioned between the blades and second series of lugs.

4. A vegetable slicer including a shaft, a hub fixed to the shaft, a rim surrounding the hub, a series of lugs carried by the hub and rim, a second series of lugs carried by the hub and rim, blades positioned between the hub and rim and having their forward edges positioned at one side of said first series of lugs and having their rearward edges positioned at the opposite side of said second series of lugs, means securing the forward edges of the blades to said first series of lugs, means securing the rearward edges of the blades to said second series of lugs for adjustment axially with respect to the forward edges of the blades, and blocks adjustably carried by the blades and having spacing elements of different thickness adapted to be positioned between the blades and said second series of lugs.

5. A vegetable slicer comprising a standard, a shaft journaled in the standard, an operating member connected to the shaft, a cutter connected to the shaft, a bracket having arms positioned at opposite sides of the cutter and secured to the standard and shaft, one of the arms of the bracket being bent downwardly to constitute an article rest, and a plate secured to the other arm of said bracket and extending downwardly therefrom.

In testimony whereof I affix my signature.

CLIFFORD C. HANKS.